United States Patent
Gonzalez Mendez

(10) Patent No.: US 11,030,347 B2
(45) Date of Patent: Jun. 8, 2021

(54) PROTECT COMPUTING DEVICE USING HASH BASED ON POWER EVENT

(71) Applicant: HEWLETT PACKARD ENTERPRISE DEVELOPMENT LP, Houston, TX (US)

(72) Inventor: Eric J Gonzalez Mendez, Aguadilla, PR (US)

(73) Assignee: Hewlett Packard Enterprise Development LP, Houston, TX (US)

(*) Notice: Subject to any disclaimer, the term of this patent is extended or adjusted under 35 U.S.C. 154(b) by 271 days.

(21) Appl. No.: 16/353,728

(22) Filed: Mar. 14, 2019

(65) Prior Publication Data

US 2020/0293694 A1 Sep. 17, 2020

(51) Int. Cl.
*G06F 21/73* (2013.01)
*G06F 21/72* (2013.01)
*G06F 21/81* (2013.01)
*G06F 21/57* (2013.01)

(52) U.S. Cl.
CPC .............. *G06F 21/73* (2013.01); *G06F 21/72* (2013.01); *G06F 21/81* (2013.01)

(58) Field of Classification Search
CPC .......... G06F 21/73; G06F 21/81; G06F 21/72; G06F 21/575
See application file for complete search history.

(56) References Cited

U.S. PATENT DOCUMENTS

| | | | |
|---|---|---|---|
| 8,677,142 B2 | 3/2014 | Hodzic et al. | |
| 8,966,284 B2 | 2/2015 | Holtzman et al. | |
| 9,443,115 B2 | 9/2016 | Berke et al. | |
| 10,311,224 B1* | 6/2019 | Farhan | H04L 9/0897 |
| 2007/0028115 A1 | 2/2007 | Kober et al. | |
| 2010/0031012 A1* | 2/2010 | Rotondo | G06F 21/00 713/2 |
| 2011/0307711 A1* | 12/2011 | Novak | G06F 21/575 713/188 |
| 2013/0132734 A1 | 5/2013 | Mao et al. | |
| 2015/0350008 A1 | 12/2015 | Kim et al. | |
| 2017/0180137 A1 | 6/2017 | Spanier et al. | |
| 2017/0220404 A1 | 8/2017 | Polar Seminario | |

OTHER PUBLICATIONS

Hewlett Packard Enterprise Development LP, "HPE Secure Compute Lifecycle: Building on the World's Most Secure Industry Standard Servers to Optimize your Security Environment," Technical White Paper, Jun. 2017, pp. 1-20.

(Continued)

*Primary Examiner* — Nelson S. Giddins
(74) *Attorney, Agent, or Firm* — Hewlett Packard Enterprise Patent Department

(57) ABSTRACT

Examples disclosed herein relate to protecting a computing device by using hashes. A baseboard management controller is to facilitate taking an inventory of components of the computing device. The baseboard management controller is also to determine a number of times the computing device has been powered on. The baseboard management controller generates a hash using a function of the number of times the computing device has been powered on and the inventory.

20 Claims, 4 Drawing Sheets

(56) References Cited

OTHER PUBLICATIONS

Heller et al., "Protecting system firmware with OpenPOWER secure boot", (webpage), available online at <https://www.ibm.com/developerworks/library/l-protect-system-firmware-openpower/index.html>, IBM, OpenPOWER secure and trusted boot, Part 2, Jun. 5, 2017, 13 pages.
Arturo M. Garcia Jr., "Firmware Modification Analysis," Thesis, Mar. 2014, pp. 1-93, Air Force Institute of Technology, Ohio, USA.

* cited by examiner

PROTECT COMPUTING DEVICE USING HASH BASED ON POWER EVENT

BACKGROUND

Service providers and manufacturers are challenged to deliver quality and value to consumers, for example by providing access to computing capabilities. A data center is a facility used to house computer networks, computer systems, and associated components, such as telecommunications and storage systems. Datacenters, offices, etc. can be end locations for computing devices manufactured by a manufacturer. Computing devices may be attacked at its endpoint, e.g., a datacenter, or in transit.

BRIEF DESCRIPTION OF THE DRAWINGS

The following detailed description references the drawings, wherein.

Figure 1:
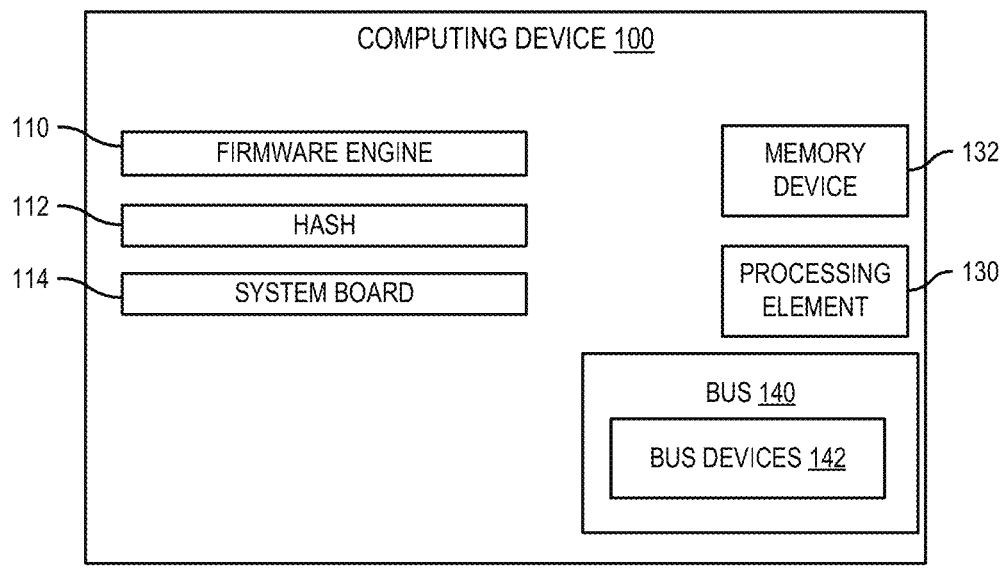
FIGS. 1 and 2 are block diagrams of computing devices capable of determining a hash based on an inventory and a number of times a computing device is powered on, according to various examples.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Service providers and manufacturers are challenged to deliver quality and value to consumers, for example by providing access to computing capabilities. A data center is a facility used to house computer networks, computer systems, and associated components, such as telecommunications and storage systems. Datacenters, offices, warehouses, etc. can be end locations for computing devices provided by a manufacturer. Computing devices may be attacked at its endpoint, e.g., a datacenter, or in transit.

One issue for a customer concerned about security is how the customer can determine with confidence that a computer system shipped from a manufacturer was not attacked or modified in the supply chain in transit from the computer manufacturer to the end customer. The transit of a computer system from the manufacturer to the end customer is an opportunity for malicious attacks on the system that can be exploited at a later time. Example exploits can include swapping out or adding hardware (e.g., special memory devices such as dual in-line memory modules with malicious components, Input/Output (I/O) cards such as Peripheral Component Interconnect Express (PCIe) cards) that can capture and compromise customer data or modify configuration settings or firmware revisions to reduce the security protections of the system. Another example potential exploit is to power on the computing system to add malicious software or take data from the computing device.

Another challenge is protecting systems from attack when a customer ships a system from one site to another or when a system is at a non-secure endpoint site. If the system is being shipped from one site to another or if it is not in a secure area, its configuration settings or hardware configuration could potentially be modified leaving the system in a less secure state.

Accordingly, approaches described herein allows for unauthorized changes to hardware components, theft of hardware components, modification of hardware components and/or firmware configurations, and/or taking data or modifying software to be detected.

The approaches used herein include taking an inventory prior to shipment of the device and a number of times the device has been powered on. The inventory and the number of times the device is powered on can be used to generate a hash. This hash can be separately provided to a user, customer, administrator, another entity (e.g., a management device of a customer), etc. The device can be placed in transit and sent to a remote location. Then, the device can be brought up and a new hash can be taken. The new hash can be compared to the hash taken prior to transit.

In one example, an entity (e.g., an automatic process during the manufacturing process or user putting the system into a mode (e.g., a secure transit mode, a secure rest mode, etc.)) in which a digital inventory of the computer system is created by a firmware component (e.g., a Basic Input Output System (BIOS), a Baseboard Management Controller (BMC), other firmware components, etc.) and securely stored.

In one example, when a customer who has selected a secure transit solution as part of a configure-to-order process receives the system or when a user who has enabled this mode themselves powers on or reboots the system, a notification can be provided to notify the user that the system is in this mode of operation. When the mode is enabled, a hash can be provided. The hash can take into account the inventory and the number of times the device has been powered on. In some examples, the hash acts as a unique code that can be used as a password to continue the boot process and/or be used to ensure that there has been no tampering of the computing device because the hashes batch.

As used herein, the term "powered on" means a number of times a device has been turned on to an on state where a boot process can begin. Further, in some examples, the BMC can be supplied with criteria as to what counts as a power on event. For example, the BMC can consider a hard power on and executing a predetermined boot instruction to be a power on event. In another example, a soft reset can count as a separate power on event. The criteria can be customized. The associated counter can be initialized and incremented each time a power on event meeting the criteria occurs. The count can be initialized, for example, while the device is in a manufacturing security state.

As used herein, the term "power supplied" means a number of times that power has been applied to the device. In some examples, a BMC can be used to count the number of times power has been applied to the device. Further, in some examples, the BMC can have criteria as to what counts as a power supply event. For example, a BMC may require that power is applied for at least a threshold amount of time before the application of power is considered to be a power on event. When more than one power supply is attached, a single power supply can trigger a power on event. Moreover, the BMC can determine whether power has been applied whether or not the device is powered on. This can occur, for example, because the BMC can be powered on in an out of band manner on a separate power rail (e.g., an auxiliary power rail) than a power rail that is used to power the device when the system is powered on. As used herein, the "count" is incremented each time a power on event occurs. The count can be initialized, for example, while the device is in a manufacturing security state.

Though various examples of power supply and power on events are used herein, it is contemplated that either can be used via similar approaches. Accordingly, as used herein, a "power event" is an event related to the application or turning on of power along. Other criteria can also be used to determine whether an event is a power event. A power event can include a power supply event and/or a power on event.

In one example, the hash can be created using a first function that is configured to set the computing device into the mode. A second function can be used while the computing device is in the mode. In one example, the second function can adjust for the count of power on being incremented. For example, the result of the second function can be configured to match the result of the first function if the count is incremented by one. One such example would include the first function using COUNT as a value to perform the hash while the second function would use [COUNT−1]. In other examples, the end user may want to set other tolerances, for example, allowing for a certain number power on events. Further in some examples, the first function can include using COUNT+1 while the second function uses COUNT.

In some examples, a centralized management system (CMS) can be used to bring on the system. The hash can be provided to the centralized management system (e.g., via an email, entry of a code, or some other channel). The centralized management system can use the hash to determine whether a potential unauthorized change or power on event occurred.

In some examples, the first calculated hash can be required by the device to take the device out of a transit mode. This can be provided via the CMS or via another input mechanism (e.g., a BMC web page or keyboard input).

The digital inventory can take multiple forms. In the one example, the digital inventory can include creating a hash (e.g., using a modern, industry standard hashing algorithm) which includes a number of items to be protected along with the number of power on events. In one example, the items can include all industry standard PCIe configuration space for all PCIe devices installed in the system. In another example, the items can include unique identifier information (e.g., serial numbers) from installed dual inline memory modules (DIMMs). In a further example, the items can include a unique identifier available in a processor. In some examples, this value is not modifiable and is unique to each individual processor. In a further example, the items can include configuration settings for firmware. This can include, for example, security settings and a Secure Boot Key database. In some examples all configuration settings can be inventoried. In other examples, a subset of the configuration settings (e.g., settings associated with security, updates, hardware components, etc.) can be inventoried. Further, firmware revisions for installed firmware (e.g., BIOS, BMC firmware, power supply firmware, controller hub firmware, custom Application Specific Integrated Circuit (ASIC) versions, etc.) on the system board or elsewhere on the computing system can be inventoried.

In some examples, the digital inventory use hardware training data (e.g., DIMM training information and PCIe card training information). Training data can be taken at time of manufacture and can be reused for this purpose. In some examples, characteristics of each of the hardware modules can be taken at multiple parameters (e.g., temperature, speed, capacitance, etc.) to create a trend parameter. In some examples, machine learning can be used to learn characteristics for various types of components. The characteristics of the module at various parameters can be inferred based on how previously tested components perform at different parameter settings. In some examples, the training data can be unique to each module. In other examples, the training data maps to a trend characteristic group and whether or not the module is within the trend characteristic group identifier is used as an identifier (though not completely unique).

In one example, the system is put into a Secure Transit mode. The system is put into this mode and a hash can be taken as described. On the next boot after the system is put into the Secure Transit Mode, the firmware (e.g., a BIOS) can create a digital inventory by creating a hash of installed hardware devices (DIMM unique identifiers, PCIe card unique identifiers within the PCI configuration space, processor unique identifiers, etc.), configuration settings, firmware revisions, etc. This digital inventory can be stored in secure non-volatile storage. Additionally, the number of times power has been applied can be determined. The digital inventory and the number of times a power event has occurred can be used in a hash function to determine a hash.

In the example, on any subsequent boot or during a check via a BMC and/or CMS, the firmware will generate the current digital startup inventory and compare the calculated digital inventory with the stored "golden" digital inventory. The power on count can also be taken into account. If the inventories match, and the power on count is within parameters, the firmware will indicate that the system is in the Secure Transit Mode (or other mode using this approach) and that the system has not been compromised. If the inventories do not match, the firmware can provide a notification (e.g., on screen or via a log message) that system is in the mode and that the system has been compromised, modified, or powered on. The count can also be presented.

Other security actions can be configured. In one example, the customer receiving the system can confirm that the system comes to them displaying the appropriate messages and has not been compromised (confirming that the hashes match).

In another example, the approaches described can also be used to allow an entity to ship a system from one site to another with the same protections. This can allow an entity to ship a system from a central site to remote locations and verify that no compromises occurred in the entity's own "supply chain." In some of these examples, parts of the inventories may not be taken, for example, firmware revision inventories. This would allow updating the firmware as needed on such a system without taking it out of the secure mode while still protecting against hardware changes or configuration setting changes.

Figure 2:
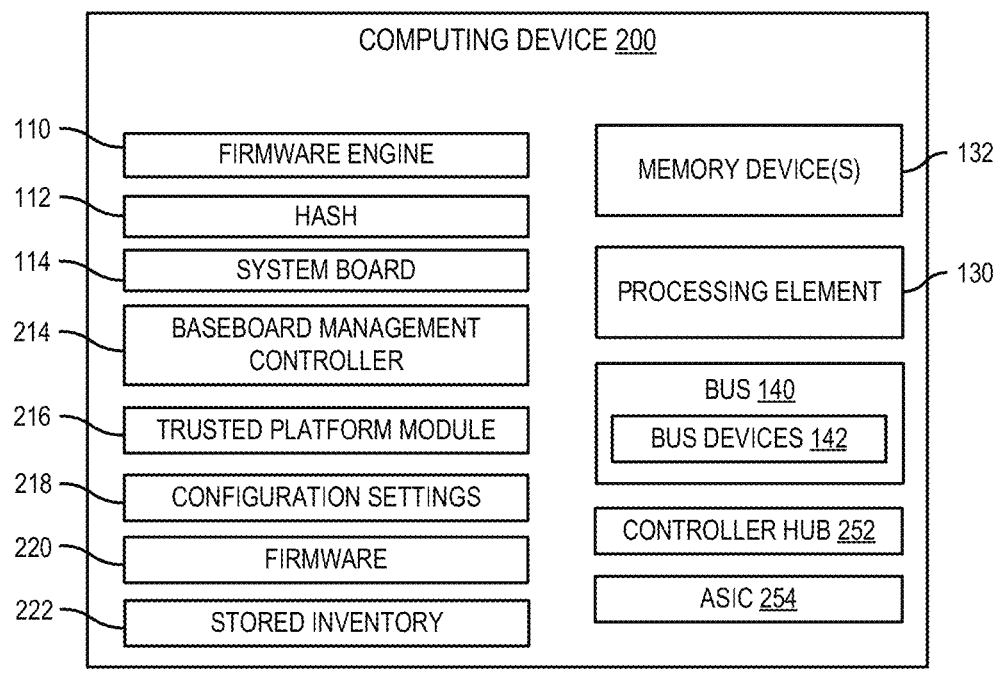

FIGS. 1 and 2 are block diagrams of computing devices capable of determining a hash based on an inventory and a number of times a computing device is powered on, according to various examples. Computing device 100 includes a firmware engine 110, a hash 112, a system board 114, a processing element 130, a memory device 132, a bus 140, and associated bus devices 142. Computing device 200 also includes a baseboard management controller (BMC) 214, a trusted platform module (TPM) 216, configuration settings 218, firmware 220, a controller hub 252, and an ASIC 254.

In some examples, the computing devices 100, 200 can also include Input/Output interfaces, which may be used to communicate with other devices, for example, via a network, provide audible information, provide visual information, etc. The input/output interfaces may also be used to implement other input/output, for example, storage functionality (e.g., access to one or multiple storage arrays).

Firmware engine 110 can be implemented using instructions executable by a processor and/or logic. In some examples, the firmware engine can be implemented as platform firmware. Platform firmware may include an interface such as a basic input/output system (BIOS) or unified extensible firmware interface (UEFI) to allow it to be interfaced with. The platform firmware can be located at an address space where the processing element 130 (e.g., CPU) for the computing device 100, 200 boots. In some examples, the platform firmware may be responsible for a power on self-test for the computing device 100, 200. In other examples, the platform firmware can be responsible for the boot process and what, if any, operating system to load onto the computing device 100, 200. Further, the platform firmware may be capable to initialize various components of the computing device 100, 200 such as peripherals, memory devices 132, memory controller settings, storage controller settings, bus speeds, video card information, etc.

In some examples, the BMC 214 can be used to implement services for the computing device 200. BMC 214 can be implemented using a separate processor from the processing element 130 that is used to execute a high level operating system. BMCs can provide so-called "lights-out" functionality for computing devices. The lights out functionality may allow a user, such as a systems administrator, to perform management operations on the computing device 200 even if an operating system is not installed or not functional on the computing device. Moreover, in one example, the BMC 214 can run on auxiliary power, thus the computing device 200 need not be powered on to an on state where control of the computing device 200 is handed over to an operating system after boot. As examples, the BMC 214 may provide so-called "out-of-band" services, such as remote console access, remote reboot and power management functionality, monitoring health of the system, access to system logs, and the like. As used herein, a BMC 214 has management capabilities for sub-systems of a computing device 200, and is separate from a processor or processing element 130 that executes a main operating system of a computing device (e.g., a server or set of servers).

As noted, in some instances, the BMC 214 may enable lights-out management of the computing device 200, which provides remote management access (e.g., system console access) regardless of whether the computing device 200 is powered on, whether a primary network subsystem hardware is functioning, or whether an OS is operating or even installed. The BMC 214 may comprise an interface, such as a network interface, and/or serial interface that an administrator can use to remotely communicate with the BMC 214. As used herein, an "out-of-band" service is a service provided by the BMC 214 via a dedicated management channel (e.g., the network interface or serial interface) and is available whether the computing device 200 is in powered on state.

In some examples, a BMC 214 may be included as part of an enclosure. In other examples, a BMC 214 may be included in one or more of the servers (e.g., as part of the management subsystem of the server) or connected via an interface (e.g., a peripheral interface). In some examples, sensors associated with the BMC 214 can measure internal physical variables such as humidity, temperature, power supply voltage, communications parameters, fan speeds, operating system functions, or the like. The BMC 214 may also be capable to reboot or power cycle the device. As noted, the BMC 214 allows for remote management of the device, as such, notifications can be made to a centralized station using the BMC 214 and passwords or other user entry can be implemented via the BMC 214.

The Operating System is a system software that manages computer hardware and software resources and provides common services for computer programs. The OS can be executable on processing element 130 and loaded to memory devices 132. The OS is a high level OS such as LINUX, WINDOWS, UNIX, a bare metal hypervisor, or other similar high level software that a boot firmware engine 110 of the computing device 200 turns control of the computing device 200 to.

In one example, an entity initiates putting the computing device 100, 200 into a first mode (e.g., an automatic process during the manufacturing process or user putting the system into a first mode (e.g., a secure transit mode, a secure rest mode, etc.)) in which an inventory of the computer system is taken by the firmware engine 110 and a number of times the computer system has been powered on is taken. As noted, in some examples, the firmware engine 110 can be implemented as platform firmware and may be implemented in conjunction with other firmware components (e.g., the BMC 214, or other microcontrollers). In one example, the firmware engine 110 can take an inventory and store the inventory as the stored inventory 222 when the computing device 100, 200 is put into the first mode.

In this example, the firmware engine 110 can take an inventory of multiple components that may be desirous to be protected and tracked. In some examples, the firmware engine 110 can wait until the next reboot of the computing device 100, 200 to perform the inventory. In other examples, the reboot is not needed. In some examples, the initiation of the mode is at boot of an operating system, where the reboot may be beneficial. For example, the computing device 100, 200 can boot to an operating system and a driver can be used in the operating system to configure the mode on next reboot of the computing device. In some examples, an application running on the operating system can be used to initiate the mode. Further, in some examples, the BMC 214 may be used to control the system during boot into the operating system. Further, in some examples, a script may be used to enable the first mode remotely. To help protect the computing device 100, 200, a number of power on is also taken when the mode is initiated.

Examples of devices or components to be inventoried include one or multiple processing elements 130, memory devices 132, the system board 114 and/or multiple components of the system board 114, bus devices 142 on one or multiple bus 140 (e.g., a PCIe bus), a controller hub 252 and/or devices connected to the controller hub 252, field replaceable unit enclosures, a northbridge device, other ASICs 254, etc. As used herein, the system board is the main printed circuit board used for the computing device 100, 200 and allows communication between many of the components of the computing device, for example, the processing element 130, the memory device 132, peripherals, bus devices, etc. In some examples, a controller hub 252 can be an I/O controller hub, for example a southbridge. The controller hub 252 may be used to manage data communications between a CPU and other components of the system board 114. In some examples, a controller hub may have direct media interface to a northbridge device or the CPU. Further the controller hub 252 may provide peripheral support for the computing device 200, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc. Other examples of identifiers that can be used include system board revision identifiers, complex programmable logic device revision identifiers, ASIC stepping identifiers, platform and chassis identifiers, riser identifiers, embedded controller identifiers, battery and power identifiers, storage component identifiers, etc.

In one example, the firmware engine 110 can interrogate (e.g., send a query and receive a response) to and from each of the components to be inventoried. This may be performed by a particular sequence to ensure that each component is detected and inventoried. In some examples, an indirect approach can be used, for example, one or more bus 140 on the computing device 100, 200 can be searched for components and then the components can be inventoried. As used herein, a bus 140 is a communication system that transfers data between components inside the computing device 100, 200. Buses can include a PCIe bus, a memory bus, a universal serial bus, etc.

In some examples, a bus device 142 can be included in a bus as a bus device 142. As used herein, a peripheral device is a component that is not part of the essential computer (e.g., a main memory or central processing unit). An example of a peripheral device on a bus is a PCIe integrated network card or a PCIe graphics accelerator. In some examples, the firmware engine 110 is not directly connected to the component and another component (e.g., the controller hub 252) and/or one or more bus can act as an intermediary between the firmware engine 110 and the components. In some examples, the inventory can include one or more unique identifiers of the respective components. In other examples, the inventory can include other static information about the component.

As used herein a memory device 132 is a component that can store information. The memory device 132 can be volatile or non-volatile. Further, the memory device 132 may be addressable by a central processing unit of the computing device 100, 200. An example of a memory device 132 includes a DIMM.

In some examples, the inventory can also include one or multiple configuration settings 218 of firmware from the firmware engine 110, other components of the system board 114, the BMC 214, field replaceable units (FRUs), etc. In some examples, the configuration information can include values for security settings, hardware enabled, hardware speed settings, voltage settings, etc. In other examples, the configuration information inventoried can include a subset of configuration settings 218 that would normally not change between boots or with usage. In some examples, the inventory may also include at least one firmware version identifier for one or multiple firmware on the computing device 200. A firmware version identifier can be an identifier of a version of the firmware being implemented on a particular component. Moreover, in some examples, hardware training information and characteristics can be stored as part of the inventory.

The inventory taken at the time the mode is initiated can be stored in the stored inventory 222. In some examples, the stored inventory 222 is a non-volatile memory. In some examples, the stored inventory 222 is in a location that is only modifiable by the firmware engine 110 (e.g., a non-volatile location that cannot be modified outside of the firmware engine 110). In a further example, cryptographic information (e.g., a signature created using a cryptographic algorithm using the stored inventory) is also taken and stored in a secure location to ensure that the stored inventory 222 is not modified. In one example, the secure location is in a Trusted Platform Module 216. In another example, the secure location is in a part of the BMC 214. In some examples, the secure location is a location that is only accessible via the firmware engine 110. As used herein, cryptographic information is information that can be used to determine whether the stored inventory at the time of initiation of the mode has been changed.

When the mode is initiated, a number of times that the power has been applied to the computing device 100, 200 is determined. In some examples, a BMC 214 can be used to count the number of times a power on event has occurred. Because the BMC 214 is on an auxiliary power supply, the BMC 214 can determine times when the computing device 100, 200 has been applied power without booting up into an on state. Further, in some examples, the BMC 214 can have criteria as to what counts as a power on event. For example, a BMC may require that power is applied for at least a threshold amount of time before the application of power is considered to be a power on event. When more than one power supply is attached, a single power supply can trigger a power on event. Moreover, the BMC 214 can determine whether power has been applied whether or not the device is powered on. This can occur, for example, because the BMC can be powered on in an out of band manner on a separate power rail (e.g., an auxiliary power rail) than a power rail that is used to power the device when the system is powered on. As used herein, the "count" is incremented each time a power on event occurs. The count can be initialized, for example, while the device is in a manufacturing security state. The count can be sampled along with the stored inventory 222 when the mode is initiated.

In some examples, the stored inventory 222 and the count is used to generate a hash 112. The hash 112 can be implemented using a hash function, such as a cryptographic hash function (e.g., MD5, SHA, SHA 256, SHA 512, Elliptic Curve Digital Signature Algorithm (ECDSA), etc.) or other hash function. As used herein, hash 112 can refer to each information of the components being separately hashed or for the whole inventory to be determined and the count and then a single hash being taken for the whole inventory along with the count. In some examples, the stored inventory 222 can be stored in plain text. Separate hashes allows for determining what changed to be simplified. In some examples, a key can be used in conjunction with the hash. As noted, in some examples, the stored inventory 222 can include a number of unique identifiers of the components found when the computing device 100, 200 was put into the mode.

The hash 112 can be communicated to a receiver of the computing device 100, 200. In a manufacturing context, when the manufacturer sends the computing device 100, 200 to the customer, the manufacturer can send the hash 112 in a side channel. The side channel may include, for example, an email, a paper document including the hash, a web portal that includes one or more hashes for the customer, etc.

In some examples, the inventory and hash can be taken on devices of the computing device 100, 200 that are accessible to the BMC 214 while the computing device is in an off state, but power is supplied. In other examples, the inventory, power on count, and hash 112 can be taken on devices of the computing device 100, 200 after the computing device has been booted up to access other inaccessible devices. The computing device 100, 200 can then be powered down and transited to a new location.

After the initialization of the mode is complete, the BMC 214 can be used to take an inventory of the system and determine the number of power on events that occurred to protect the system. In one example, the BMC 214 can work with the firmware engine 110, which can execute firmware 220 to execute a boot process. In one example, during boot, the processing element 130 starts by fetching instructions at an address mapped to a location of the firmware 220 being executed.

In one example, the BMC 214 can facilitate taking an inventory. The firmware engine 110, during a boot process, can take a startup inventory of the computing device 200 including a plurality of startup components. The startup inventory includes information about at least one processing element 130, at least one memory device 132, the system board 114, and at least one bus device 142 on the bus 140. A same process for taking the inventory at time of initialization of the mode can be used for taking the startup inventory. The BMC 214 can also determine a number of times a power on event has occurred. The firmware engine can provide the partial or complete inventory to the BMC 214. A current hash can be taken on the computing device 100, 200 based on the startup inventory and the number of times the power on event has occurred.

The hash function used for creating the hash when putting the device into the mode can be different from the hash function used for creating the current hash. In particular, since it should be assumed that power has been removed from the system at least once and then a new power on event should occur, the hash function can take this into consideration. For example, the current hash can be based on a function including the number of times the computing device has been powered on minus one, while the original hash can be based on a function include the number of times the computing device has been powered on. Accordingly, the current hash can be on the next power on of the computing device compared to the generation of the original hash.

The BMC 214 can receive, via an input mechanism, a value. The value can be the original hash created when the computing device 100, 200 was placed into the mode. The BMC 214 can compare the current hash to the value to determine whether a security event has occurred based on the comparison of the value and the current hash. If the two match, the BMC 214 does not detect an anomaly.

If the two do not match, the BMC 214 can detect that a security event has occurred. The BMC 214 can perform a security action in response to the determination that a security event has occurred.

For example, if the startup inventory and stored inventory 222 do not match, a notification can be provided. The notification can include information that a modification has been detected. Further, the notification can be visual (e.g., an output to a display) or as a log alert sent to an administrator. In some examples, a management console or platform, such as a central management system, can be provided the information. In some examples, the firmware engine 110 does not allow booting to a higher level operating system as part of the security action. In other examples, the amount of power on events can be provided. For example, if the original hash had A number of power on events, the expected number was A+1, but the number of power on events was B, A, A+1, and/or B can be provided. As such, as part of the security action, the number of times the computing device has been powered on can be provided.

In one example, the BMC 214 may be associated with a secure storage, a hardware root of trust, or other security features. In one example, on initial boot of the computing device 200 into a service operating system (OS) or provisioning engine in a factory, a unique private and public key are generated and 'glued' onto the system by being saved into the BMC storage. This storage can be persistent and not replaceable. The BMC 214 may allow access to a key using an application programming interface. The values can be written to a write once register on a same Application Specific Integrated Circuit (ASIC) as the BMC. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the BMC 214 can be used to ensure that firmware of the computing device 200 is secure (e.g., by ensuring that firmware is not updated unless it is signed or encrypted using a public key that the private key of the BMC 214 can decrypt. Further, in some examples, the BMC 214 can stop the computing device 200 from booting with compromised firmware.

Processing element 130 may be one or multiple central processing unit (CPU) or a combination of a CPU and other components such as a graphics processing unit (GPU), or microprocessor suitable for retrieval and execution of instructions and/or electronic circuits configured to perform the functionality described herein. In some examples, the firmware engine 110 may be implemented as a series of instructions encoded on a machine-readable storage medium of computing device 100, 200 and executable by processing element 130.

In some examples, a silicon root-of-trust feature supported by the computing device is used to ensure that the firmware on the computing device 100, 200 is not compromised. The silicon root-of-trust ensures that the BIOS and BMC Firmware cannot be replaced with non-authentic BIOS and BMC Firmware even with physical access to the system.

A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). Computing devices can connect to other devices using the communication network.

By way of example, devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 3:
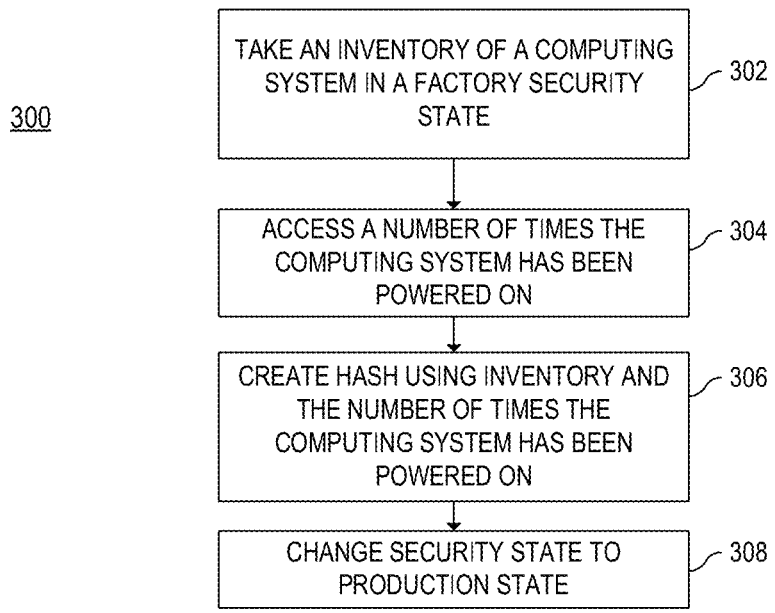
FIG. 3 is a flowchart of a method for generating a hash using an inventory of a computing system and a number of times the computing system is powered on, according to an example.
Figure 4:
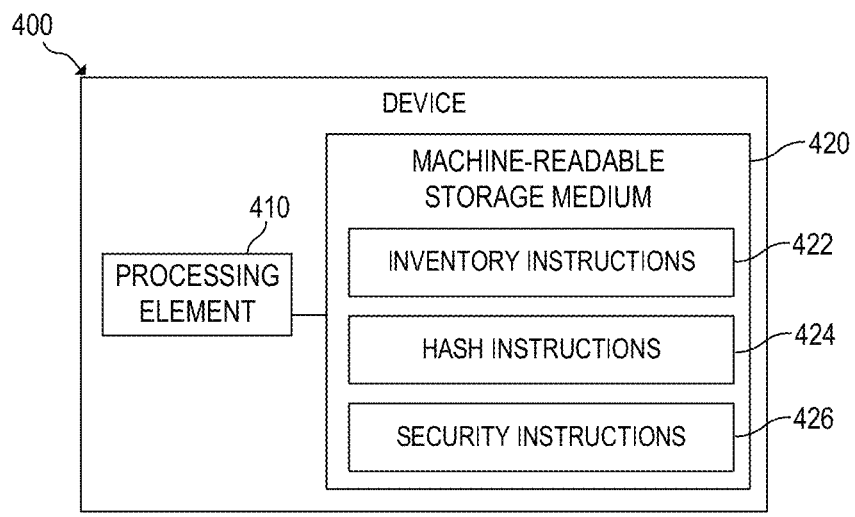
FIG. 4 is a block diagram of a device capable of executing a method to generate a hash using an inventory of a computing system and a number of times the computing system is powered on, according to an example.

FIG. 3 is a flowchart of a method for generating a hash using an inventory of a computing system and a number of times the computing system is powered on, according to an example. FIG. 4 is a block diagram of a device capable of executing a method to generate a hash using an inventory of a computing system and a number of times the computing system is powered on, according to an example.

The device 400 includes, for example, a processing element 410, and a machine-readable storage medium 420 including instructions 422, 424, 426 for securing a device based on a comparison of inventories. Device 400 may be, for example, a BMC in a server.

In certain examples, processing element 410 may include, one or multiple physical controllers or processors, one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Processing element 410 may fetch, decode, and execute instructions 422, 424, 426 to implement method 300. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a flash memory, a Compact Disc Read Only Memory (CD-ROM), and the like. As such, the machine-readable storage medium can be non-transitory. As described in detail herein, machine-readable storage medium 420 may be encoded with a series of executable instructions for performing method 300.

Although execution of method 300 is described below with reference to device 400, other suitable components for execution of method 300 can be utilized (e.g., computing device 100, 200). Additionally, the components for executing the method 300 may be spread among multiple physical devices. Method 300 may be implemented in the form of executable instructions stored on a machine-readable storage medium, such as storage medium 420, and/or in the form of electronic circuitry.

The device 400 can be in a mode where it can take input. The input can be used to turn on a mode (e.g., a secure mode, a transit mode, etc.). The mode can be implemented by a customer or at the end of a manufacturing process, where the computing system is changed from a factory mode into a production mode including this mode.

As part of implementation of the mode, at 302, processing element 410 can execute inventory instructions to take an inventory of the computing system. As noted above, on next boot or without a new boot, the inventory instructions 422 can be executed to implement the mode and take an inventory.

The inventory can be based on a number of unique identifiers associated with particular components of the computing system. For example, at least one unique identifier can be associated with each main memory module installed on the device, each processor installed on the device, a system board of the device, each of a number of bus devices in a configuration space of a bus of the device, combinations thereof, etc. In some examples, the configuration space is the underlying way that a protocol used to implement the bus performs auto configuration of components (e.g., cards) inserted into the bus. An example of a configuration space is the PCIe configuration space.

Further, as noted above, the inventory can be based on one or multiple configuration settings. Moreover, in some example, version information about each of a number of firmware implemented on the device can be included in the inventory. In some examples, the device 400 is a BMC and the BMC can use multiple portions of the computing system (e.g., firmware engines) to collect the information about the components, for example, by asking a firmware engine to provide the information requested, using a bus, and/or other intermediaries. The inventory can be stored at the device 400 or at another location such as a TPM.

As noted above, the BMC can count power events for the computing system (304). The count can be related to, for example, a power on event or a power supply event. The count can be initialized at a factory and incremented at each monitored event.

In some examples, at 306 the inventory and the count is used to create a hash by executing hash instructions 424. The hash can be implemented using a hash function, such as a cryptographic hash function (e.g., MD5, SHA, etc.) or other hash function. In some examples, the data taken in the inventory can be added together with the count to create a dataset that is hashed.

The hash can be represented as a value that can be communicated to a receiver of the computing system. In one example, a manufacturer configures the computing system in a factory security state. When a computing device such as a server is assembled and begins the factory process, it can be in a factory security state. The factory security state allows access to information and programming of data on the computing device in order to prepare it to ship to a customer. This can allow for security parameters such as management passwords to be written and read. In some examples, the factory security state can be used for, license confirmation, factory initialization of components within a device chassis, testing devices using direct access, verifying and recording inventory of devices and/or settings in the device, etc. In this state, the BMC, e.g., the device 400, can be initialized to a value for the number of power on events the computing system has.

Once the computing device has completed the factory process, the computing device is put into a production security state. This can lock and prevent access to password and other information on the computing device by limiting capabilities to access these features. This can be the desired security state to harden the computing device for field use. Thus, the device is more secure in the production security state. Particular security measures can be implemented such that the factory security state cannot be returned to unless proof is provided that a user is authorized, for example, by using a manufacturing key. In some examples, the security measure may also require some proof of location (e.g., a manufacturing location of the manufacturer). The BMC and the computing system can be switched to a production security state based on a trigger (308). In one example, the trigger can include setting the system into the transit mode.

In a manufacturing context, when the manufacturer sends the computing system to the customer, the manufacturer can send the hash value in a side channel. The side channel may include, for example, an email, a paper document including the hash, a web portal that includes one or more hashes for the customer, etc. Similarly, in the context of another entity, e.g., the user switching the system into the mode, the user may use a side channel to send the hash value.

Figure 5:
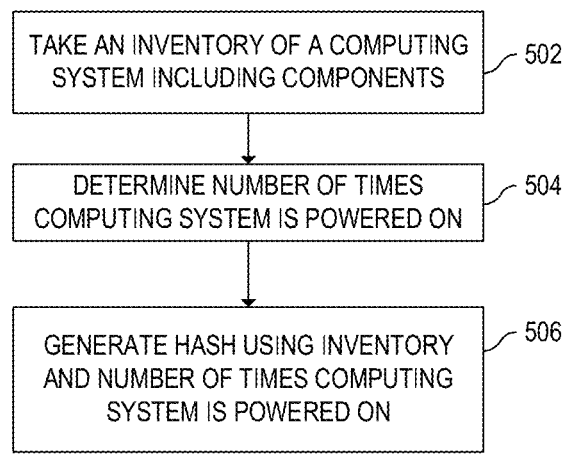
FIG. 5 is a flowchart of a method for creating a hash using an inventory and number of times a computing system is powered on, according to an example.

FIG. 5 is a flowchart of a method for creating a hash using an inventory and number of times a computing system is powered on, according to an example. Although execution of method 500 is described below with reference to device 400, other suitable components for execution of method 500 can be utilized (e.g., computing device 100, 200). Additionally, the components for executing the method 500 may be spread among multiple physical devices. Method 500 may be implemented in the form of executable instructions stored on a machine-readable storage medium, such as storage medium 420, and/or in the form of electronic circuitry.

Once the computing system is taken to its end destination, the computing system can be supplied power. At 502, inventory instructions 422 can be executed by the processing element 410 to take a current inventory of the computing system as discussed above. In some examples, components can be checked by a BMC using auxiliary power. In other examples, additional components can be inventoried after the computing system is booted.

As noted, the current inventory can be based on a number of unique identifiers associated with particular components of the computing system. For example, at least one unique identifier can be associated with each main memory module installed on the device, each processor installed on the device, a system board of the device, each of a number of bus devices in a configuration space of a bus of the device, combinations thereof, etc. In some examples, the configuration space is the underlying way that a protocol used to implement the bus performs auto configuration of components (e.g., cards) inserted into the bus. An example of a configuration space is the PCIe configuration space.

Further, as noted above, the current inventory can be based on one or multiple configuration settings. Moreover, in some example, version information about each of a number of firmware implemented on the device can be included in the inventory. In some examples, the device 400 is a BMC and the BMC can use multiple portions of the computing system (e.g., firmware engines) to collect the information about the components, for example, by asking a firmware engine to provide the information requested, using a bus, and/or other intermediaries. The current inventory can be stored at the device 400 or at another location such as a TPM. As noted above, the BMC can count power events for the computing system. At 504, the processing element 410 can determine a current number of times a power event has occurred in a running count kept by the BMC or other ASIC.

At 506, hashing instructions 424 can be executed to generate a hash of the current inventory and the number of times the power event has occurred. The hashing can use a hash function as described above. The hash function can be different from the hash function used to put the computing system into the transit mode.

Security actions 426 can be executed by the processing element 410. In one example, the device 400 can receive a value as input. The value can be the original hash that was calculated and sent via a side channel. The device 400 can determine whether a security event occurred by comparing the value and the current hash. In some examples, the device 400 can perform a security action in response to the determination that a security event has occurred. As noted above, as part of the security action, the number of times the power event has occurred can be provided. Further, the expected number of times the power event is supposed to occur can be provided. Moreover, in some examples, the current inventory and the expected inventory can be provided.

In some example, when the computing system is placed in the mode, the computing system can require that the value be provided in order to continue booting. As such, the computing system can be protected from a malicious entity attempting to boot the computing system.

Figure 6:
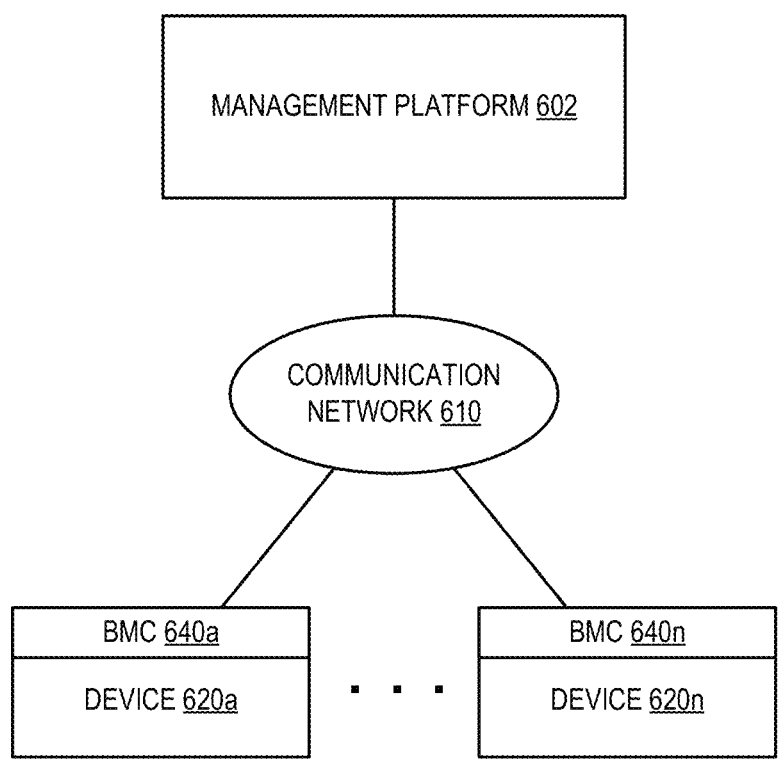
FIG. 6 is a diagram of a system including a management platform and devices capable of creating a hash using an inventory and a number of times a device is powered on, according to an example.

FIG. 6 is a diagram of a system including a management platform and devices capable of creating a hash using an inventory and a number of times a device is powered on, according to an example. System 600 can include a management platform 602 and a plurality of devices 620a-620n. Each device can include a BMC 640a-640n. The management platform 602 and devices 620a-620n can be implemented via a processing element, memory, and/or other components.

A communication network 610 can use wired communications, wireless communications, or combinations thereof. Further, the communication network 610 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 610 can be in the form of a direct network link between devices. Various communications structures and infrastructure can be utilized to implement the communication network(s).

By way of example, the management platform 602 and BMCs 640a-640n communicate with each other and other components with access to the communication network 610 via a communication protocol or multiple protocols. A protocol can be a set of rules that defines how nodes of the communication network 610 interact with other nodes. Further, communications between network nodes can be implemented by exchanging discrete packets of data or sending messages. Packets can include header information associated with a protocol (e.g., information on the location of the network node(s) to contact) as well as payload information.

In some examples, the communication network 610 can be implemented as a management network. The management network can be segregated from a production network of the devices. For example, a production network may be connected to the Internet, while the management network is firewalled away from the outside world.

The management platform 602 can include a view of multiple devices 620. The management platform 602 can be used to set one of the devices 620a into a transit mode as discussed above and be used to receive the value.

In some examples, the device 620*a* can then be transferred to a new system in a similar configuration as the system 600. In these examples, the management platform can be used to receive security alerts, enter inputs (e.g., a hash value created when the device 620*a* is put into the mode), and receive communications. Accordingly, when a security alert occurs, it can be provided to the management platform, which can act on the security alert.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
   at least one processing element;
   at least one memory device;
   a bus including at least one bus device;
   a system board;
   a baseboard management controller separate from the at least one processing element that is to:
   facilitate taking an inventory of the computing device including a plurality of components, wherein the inventory includes information about the at least one processing element, the at least one memory device, the system board, and the at least one bus device on the bus;
   determine a number of times a power event occurs on the computing device; and
   generate a hash using a function of the number and the inventory.

2. The computing device of claim 1, wherein the baseboard management controller is further to:
   receive, via an input mechanism, a value; and
   determine whether a security event has occurred based on a comparison of the value and the hash.

3. The computing device of claim 2, wherein the baseboard management controller is further to:
   perform a security action in response to a determination that the security event has occurred.

4. The computing device of claim 3, wherein the baseboard management controller is further to:
   provide, as part of the security action, the number of times the power event has occurred.

5. The computing device of claim 3, wherein the value is generated from a manufacturing inventory and a second function of a second number of times the power event has occurred at a time at the end of the computing device being in a factory security state.

6. The computing device of claim 5, wherein the baseboard management controller is further to:
   generate the hash on the next power on of the computing device compared to the generation of the value.

7. The computing device of claim 5, wherein the hash is based on the function including the number of power events minus one.

8. A method comprising:
   taking, by a baseboard management controller (BMC) of a computing system, an inventory of the computing system including a plurality of components,
   wherein the computing system includes at least one processing element, at least one memory device, a bus including at least one bus device, the BMC, and a system board,
   wherein the BMC is separate from the at least one processing element,
   wherein the inventory includes information about the at least one processing element, the at least one memory device, the system board, and the at least one bus device on the bus;
   determining, by the BMC, a number of times the computing system is powered on; and
   generating, by the BMC, a hash using a function of the number and the inventory.

9. The method of claim 8, further comprising:
   receiving, by the BMC, via an input mechanism, a value; and
   determining whether a security event has occurred based on a comparison of the value and the hash.

10. The method of claim 9, further comprising:
    performing, by the BMC, a security action in response to a determination that the security event has occurred.

11. The method of claim 10, further comprising:
    providing, by the BMC, as part of the security action, the number of times the computing device has been powered on.

12. The method of claim 10, wherein the value is generated using a second function based on a manufacturing inventory of the computing system and a second number of times the computing system was powered on at a time at the end of the computing system being in a factory security state.

13. The method of claim 12, further comprising:
    generating the hash on the next power on of the computing system from a shutdown at the end of the factory security state.

14. The method of claim 12, wherein the hash is based on the function including the number of times the computing device has been powered on minus one.

15. A non-transitory machine-readable storage medium storing instructions that, if executed by a baseboard management controller (BMC), cause the BMC to:
    take an inventory of a computing system including a plurality of components,
    wherein the computing system includes at least one processing element, at least one memory device, a bus including at least one bus device, the BMC, and a system board,
    wherein the BMC is separate from the at least one processing element,
    wherein the inventory includes information about the at least one processing element, the at least one memory device, the system board, and the at least one bus device on the bus;
    determine a number of times the computing system is powered on;
    generate, a hash using a function of the number and the inventory;
    receive a value; and
    determine whether a security event has occurred based on a comparison of the value and the hash.

16. The non-transitory machine-readable storage medium of claim 15, further comprising instructions that, if executed by the BMC, cause the BMC to:
   perform security action in response to a determination that the security event has occurred.

17. The non-transitory machine-readable storage medium of claim 16, further comprising instructions that, if executed by the BMC, cause the BMC to:
   provide as part of the security action, the number of times the computing device has been powered on.

18. The non-transitory machine-readable storage medium of claim 16, wherein the value is generated using a second function based on the inventory and a second number of times the computing system was powered on at a time at the end of the computing system being in a factory security state.

19. The non-transitory machine-readable storage medium of claim 18, further comprising instructions that, if executed by the BMC, cause the BMC to:
   generate the hash on the next power on of the computing system compared to the power on of the computing system used to generate the value.

20. The non-transitory machine-readable storage medium of claim 18, wherein the hash is based on the function including the number of times the computing system has been powered on minus one.

* * * * *